Feb. 28, 1933.   V. P. WILLIAMS   1,899,840
UNIVERSAL JOINT WITH ADJUSTABLE BUSHINGS
Filed March 20, 1931   5 Sheets-Sheet 1
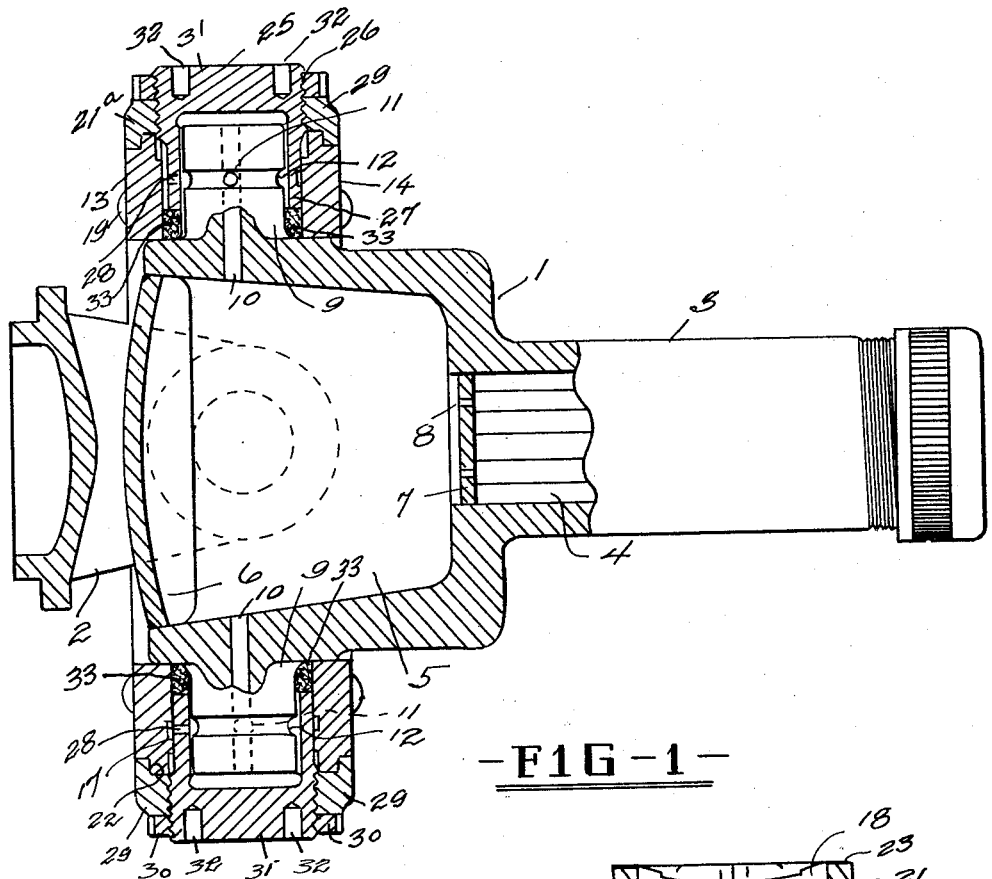
-FIG-1-
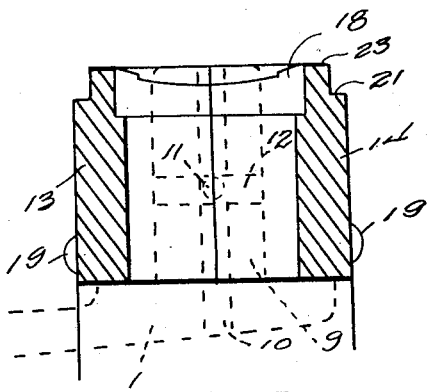
-FIG-2-   -FIG-3-
Inventor
VILLOR. P. WILLIAMS.
By
Attorney

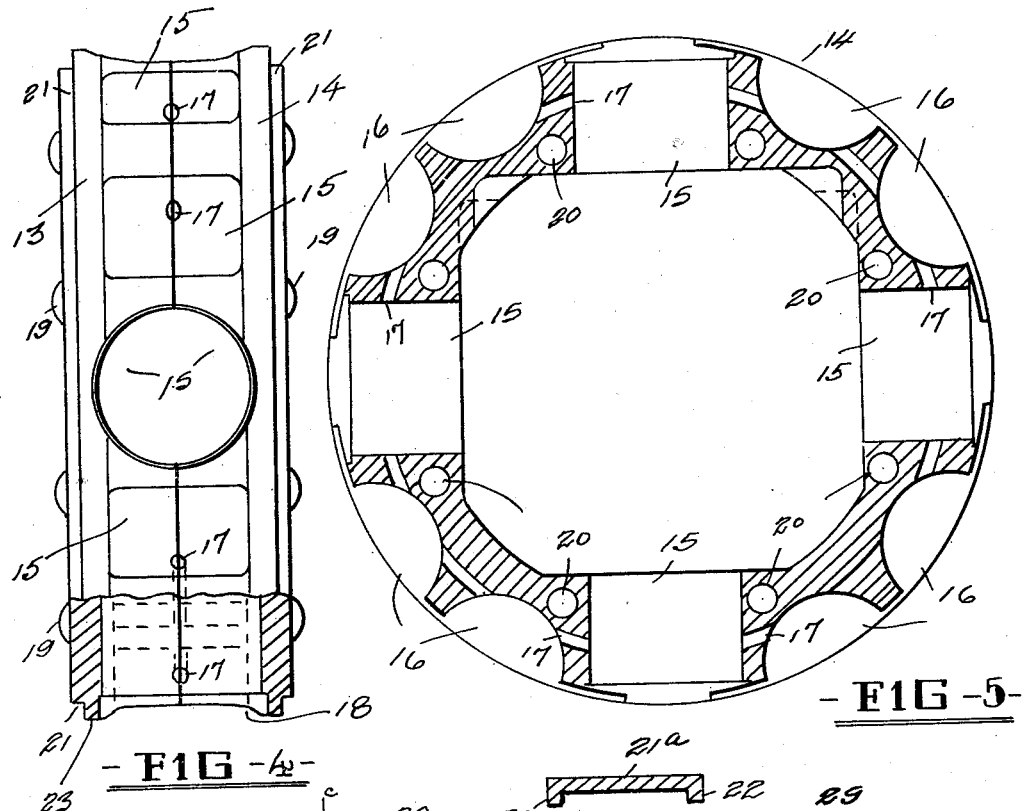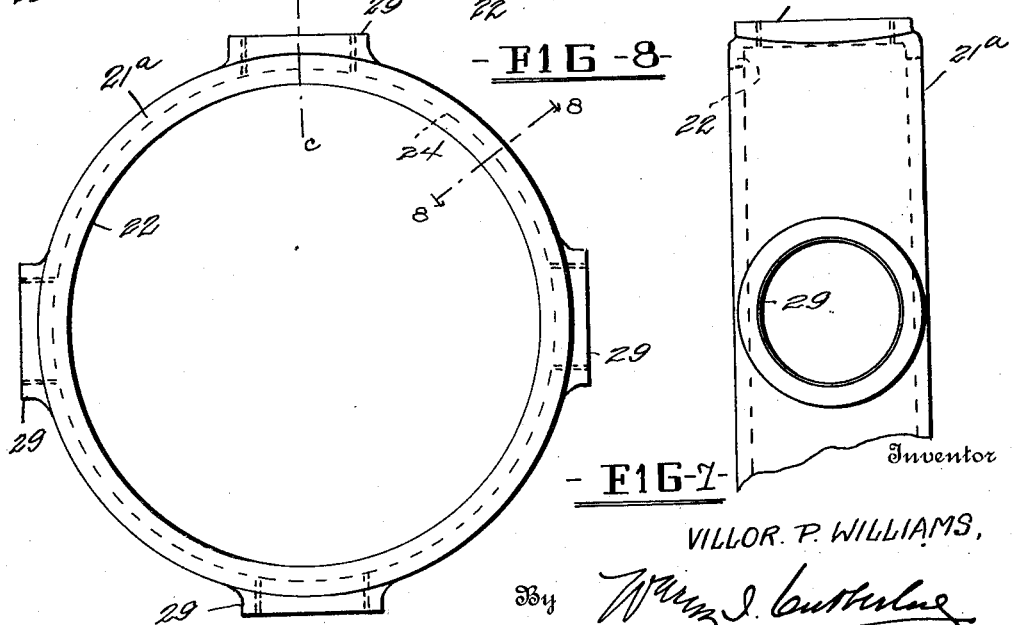

Feb. 28, 1933.  V. P. WILLIAMS  1,899,840
UNIVERSAL JOINT WITH ADJUSTABLE BUSHINGS
Filed March 20, 1931   5 Sheets-Sheet 3
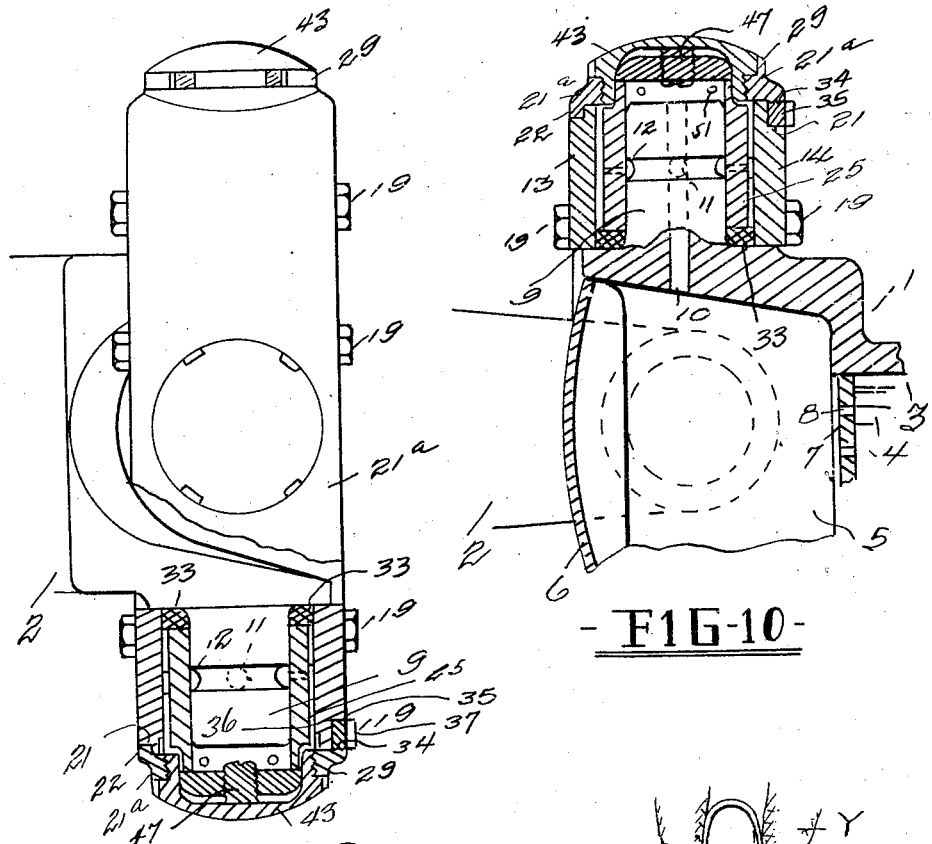
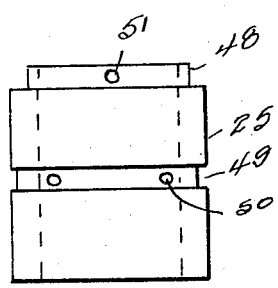
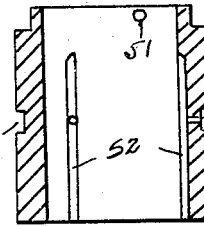
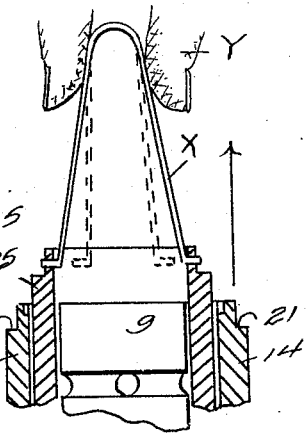
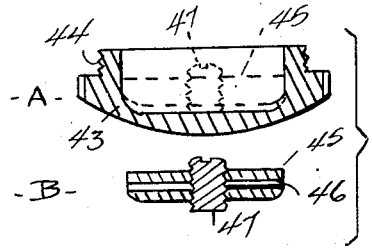
Inventor
VILLOR P. WILLIAMS,
By
Attorney

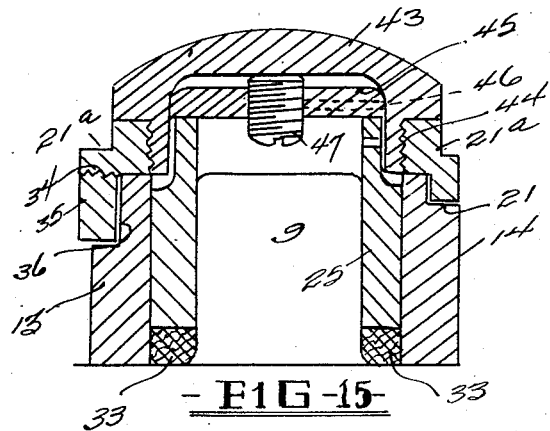
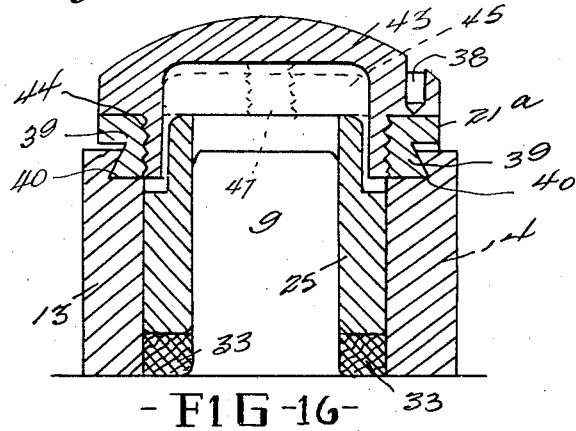
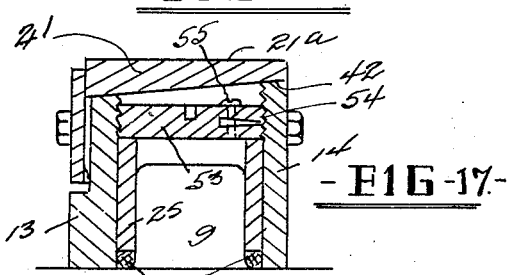
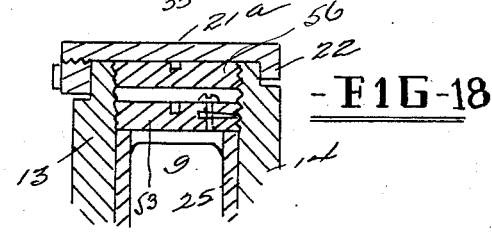
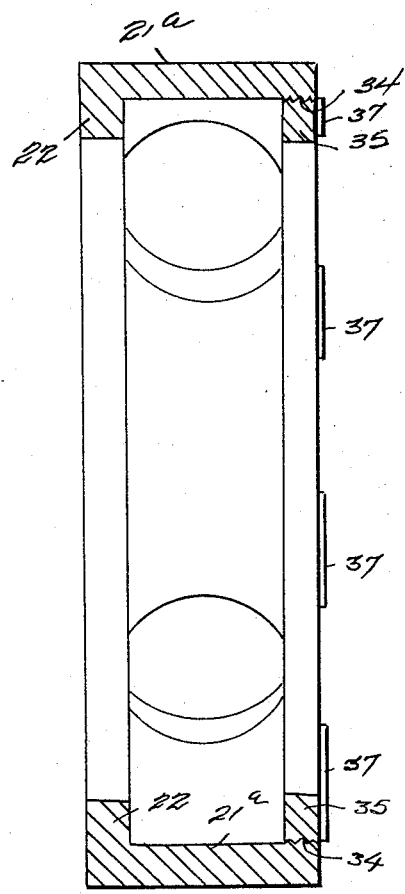

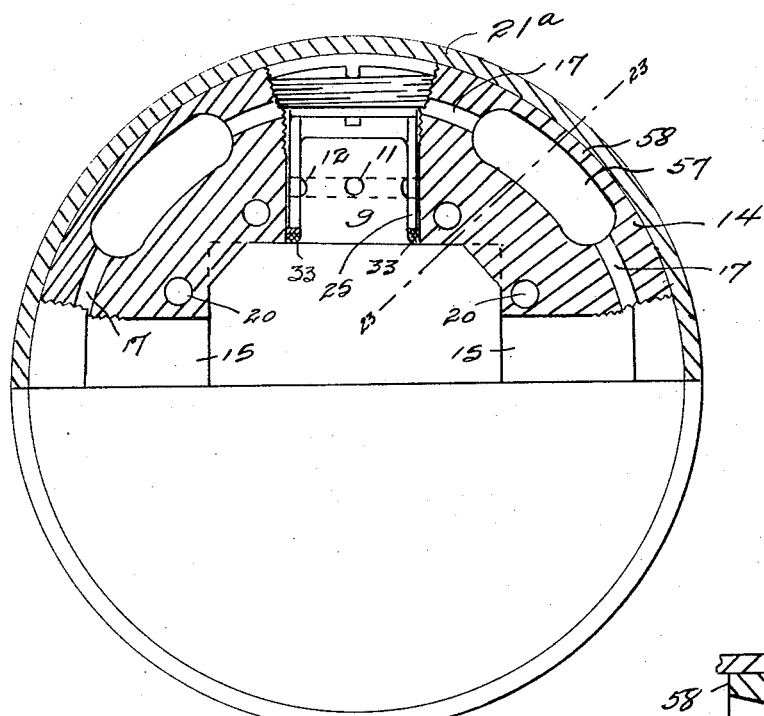
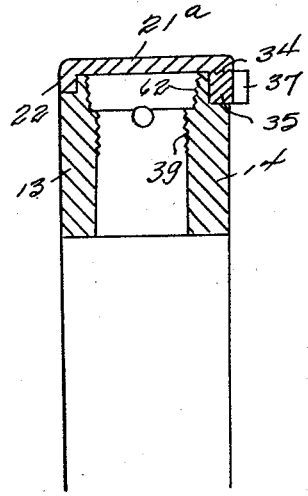
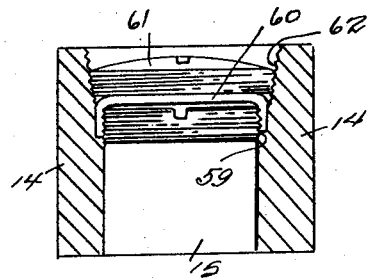
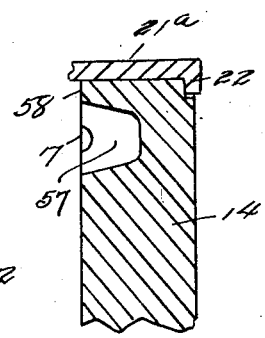
FIG-20-
FIG-23-
FIG-22-
FIG-21-
Inventor
VILLOR. P. WILLIAMS.

Patented Feb. 28, 1933

1,899,840

UNITED STATES PATENT OFFICE

VILLOR P. WILLIAMS, OF BALTIMORE, MARYLAND, ASSIGNOR, BY MESNE ASSIGNMENTS, TO ESTELLE P. WILLIAMS, OF BALTIMORE, MARYLAND

UNIVERSAL JOINT WITH ADJUSTABLE BUSHINGS

Application filed March 20, 1931. Serial No. 524,173.

My present invention in its broad aspect has reference to improvements in means for lubricating, balancing, and preventing leakage of universal joint; and especially in preventing leakage of lubricant from about the pins or trunnions of the joint. More particularly it is my purpose to provide in conjunction with the pins or trunnions of a universal joint adjustable bushings about the pins for retaining packing to prevent leakage of lubricant from about the pins, and to afford access to the pins. The universal joint per se is of the type illustrated in my copending application for patent on universal joint with shroud, filed November 11, 1930, Serial #496,756; and the method of lubricating the same follows out the teachings of my copending application upon method of lubrication, filed April 2, 1930, Serial #441,145; the broad principal of universal joint construction herein shown in conjunction with my present invention is an improvement on my patent on universal joints, granted March 17, 1931, #1,797,215.

One of the particularly annoying and disadvantageous features of universal joints has been the difficulty in continuously preventing leakage from about the pins or trunnions. Temporary stoppage of leakage can be obtained by placing washers at the bases of the pins, but it is simply a matter of a very short time before the washers wear and are useless; the reason being the unusual angles of strain to which such pins are subjected. So also have universal joints been completely encased, but this increases the cost. The ideal means for preventing leakage involves the utilization of packing as distinguished from washers and the like; means for adjusting the pressure on the packing and at the same time holding the packing in place; means whereby the packing may be changed when worn out; and means whereby the pin itself may be inspected, and means for lubricating the pins effectively and continuously. My present invention accomplished all of these purposes in a simple, effective, and inexpensive way.

Another object of my present invention is to attain suitable continuous and positive lubrication of all of the working parts of a universal joint including the pins. To this end I provide a system of lubrication having a closed reservoir in an integral part of the knuckle and a closed system of lubrication in conjunction therewith of the type defined in my co-pending application, Serial #515,607, filed February 13, 1931, but I have improved on this system and in addition I have provided means for perfectly balancing the joint. My present invention also involves an improved type of shroud of the type defined in my copending application, Serial #515,607, filed February 13, 1931, and in conjunction with the shroud primary means for holding the two ring sections together in a heavy duty joint.

Furthermore, my present invention involves the provision of detachable means, as for instance a detachable ring forming a flange on the shroud, for permitting ready removal of the shroud completely from about the rings of the joint thereby to enable one to completely disassemble the joint without returning it to the factory, and to obtain access not only to the pin (as by removal of the bushings) but also to the interior surfaces of the ring sections. Also I have provided means whereby the bushings and locking and adjusting devices therefore may be wholly concealed within the shroud, and the like.

While the foregoing are some of the major objects of my present invention, other and equally important objects will become apparent as the detailed description of the parts thereof is taken up, but interpretation of the scope of my invention should only be conclusive when made in the light of the claims appended hereunto and forming part of this specification.

In the drawings wherein are illustrated several important embodiments of my invention following out the principal involved herein;—

Figure 1 is an assembly view in section through two of the pins, and through the reservoir for lubricant, Figure 2, view A is a side view of the adjustable bushing; view B is of the lock nut for holding the bushing in adjusted position; and view C is a section on the line c—c of the shroud in Figure 6, Figure 3 is a section through the ring sections at the pin cavity, Figure 4 is an edge view of the ring assembly, Figure 5 is an inside view of a ring section and shows the lubricating and balancing cavities and oil ducts, Figure 6 is an edge view of the shroud, Figure 7 is a fragmentary elevation of the shroud, Figure 8 is a detail on the line 8—8 of Figure 6, Figure 9 is an assembly view of a modified form of my joint showing a removable shroud, and a somewhat different structure for adjusting the bushing, Figure 10 is a detailed assembly view of the form shown in Figure 9, Figure 11 is a view of the bushing used in the form shown in Figure 9, Figure 12 is a section through the bushing showing the oil ducts, Figure 13 is a view of the tool and method of removing the bushing, Figure 14, view A is of the cap carried by the shroud for each bushing, and view B is of the adjusting washer for the bushing carried in the cap, Figure 15 is a view of my detachable shroud, Figure 16 is a modified form of detachable shroud, Figure 17 is another modified form of detachable shroud, as also is Figure 18, and Figure 19 is a section through a form of my detachable shroud.

Figure 20 is a section through a modified form of my invention showing the use of enlarged oiled storage channels, in conjunction with the lubricating grooves of the ringed sections, and also showing a modified form of my bushing adjustment member.

Figure 21 is a transverse section through the ring sections and shroud of the form shown in Figure 20 with the bushing removed.

Figure 22 is a section in detail of my modified form of bushing adjustment, and

Figure 23 is a section on the line 23—23 of Figure 20.

In the drawings wherein like characters of reference are used to designate like or similar parts throughout the several views;—

The numeral (1) designates the male elements of a universal joint, i. e. the male knuckle; and (2) the female knuckle; (3) is the shank of knuckle (1) which is bored and splined at (4). In an integral part of the head of knuckle (1) is formed a cavity (5) for storage of lubricant, which is sealed by a plate (6) preferably arc welded in place; a sealing plate (7) separates the cavity from the splined bore, and has ports (8) for lubricating the splines. The knuckle (1) has pins or trunnions (9) which are internally bored at (10) to the cavity (5), with ducts (11) leading to the annular oil grooves (12) about the pins. All of the foregoing construction is similar to that of my prior patent Number 1,797,215 granted March 17, 1931.

The pins or trunnions of knuckles (1) and (2) are retained in assembly by a ring formed with two similar sections (13) and (14), each being provided with registering cavities (15) forming together the pin openings. In the material of each section between the cavities (15) are cut out portions (16) which serve to balance the joint, and these are in communication with each other and with cavities (15) by an annular oil channel (17) which receives its supply of oil from the cavity (5) through bores (10), ducts (11) and grooves (12) which register with the channel. The ring sections are also provided with a peripheral oil distributing groove (18).

A plurality of bolts, rivets, or the like (19) are provided in openings (20) for holding the ring sections together.

It will be noted that the cavities (15) form openings relatively quite a bit or considerably larger than the diameter of the pins.

Each ring section is annularly grooved as at (21) on its outside edge to receive thereabouts a shroud (21a) of the type defined in my co-pending application for patent on universal joints with shroud, filed November 19, 1930, Serial #496,756, and universal joint with lubricating shroud, filed February 13, 1931, Serial #515,607. The shroud is annularly flanged down at (22) to engage into the grooves (21) of the ring sections in assembly, and assists in holding the ring sections in assembly, and in preventing leakage of oil at the ends of the pins and from between the ring sections. The shroud seats on the bearing part (23) on the ring sections and there is an oil channel (24) between the under face of the shroud and the outer face of the ring.

The most important part of my present invention consists in the provision of a cylindrical bushing (25) about each pin, and located on the space left between the cavities (15) and the pins. Each bushing has a screwthreaded part (26) and a body part (27) formed with an oil duct (28) registering with oil channel (17) and grooves (12) in the pins, and the shroud (21a) is provided with threaded bosses (29) into which the bushings are screwed in place. Accordingly the bushings are adjustable and they are held in adjusted position by lock nuts (30). Each bushing (25) has a relatively thick, solid head (31) drilled to form pockets (32) for a spanner wrench to turn the same. In practice the bushings are of hardened steel, but by the use of bushings of this character it is not necessary to case harden the ring sections.

Referring now especially to Figure 1 where the assembly is shown, it will be noted that in order to effectively and completely seal the pins against leakage there is placed some packing (33) about the base of the pin against which the lower edge of each bushing bears to press the packing (33) not only down but out against the walls of the pins and rings completely sealing the pin. As the packing wears each bushing is merely given a turn or a part of a turn to make the joint tight again, and when the packing is completely worn out, it is merely necessary to remove the bushings and the packing and insert new packing; a very simple operation taking but a few moments. Furthermore access can always be had to the pins and to the oil ducts should they by any chance become clogged, and the joint assembly is not only leak proof, self lubricated at all times, and exceptionally strong, but every part is readily accessible without using special tools or without disarranging its parts, taking it apart, or perhaps returning it to the factory. It is believed from the foregoing that the operation of my present joint is apparent, but it is again emphasized that some details of construction and form of the parts may be changed without departing from the spirit of my invention, and that such changes are permissible provided they fall within the scope of what is claimed.

Referring now to the forms of my invention shown in Figures 9 to 19; and especially to Figures 9 to 14, it will be seen that instead of permanently swaging or flanging down both edges of the shroud (21a) I have flanged down but one edge (22); the inner surface of the remaining edge being threaded as at (34) to receive a threaded detachable ring (35).

The ring (35) in effect forms a detachable flange like member which seats in a somewhat enlarged groove (36) which is similar to groove (21) in the peripheral edge of ring section (14). Preferably the ring (35) has lugs on its outer surface designated (37) for receiving a tool for rotating or unscrewing the same to disengage it from the shroud. See Figure 19. Thus in assembling the joint with this form of my invention it is merely necessary to place the ring sections (13) and (14) together about the pins (9), insert the bolts (19) and slip the shroud (21a) over the edges of the ring sections, and then screw the ring (35) in place, there being a suitable set screw or the like (38) see Figure 16 for holding the ring (35) against accidental unscrewing movement. The construction of this detachable shroud is subject to considerable structural modification without departing from the spirit of the invention as disclosed in Figures 15—16—17—18. In Figure 16 the shroud (21a) is formed with a mitred or half-dovetail part (39) which fits into cooperating and complementary half-dovetail grooves (40) in the ring sections (13) and (14) so that when the ring sections are bolted together the shroud will be permanently locked in place until the ring sections are disassembled. In Figure 17 ring sections (13) and (14) have beveled outer edges on which a wedge shaped ring shroud (41) fits and is held in place by locking plates (42). The shrouds in Figures 15-18 and 19 are held in place similarly to that in Figure 9, but the structure of the bushing adjusting members is different in Figures 17 and 18.

As will be seen by reference to Figures 9 to 19, I have provided modified means, somewhat different in construction from the lock washer in Figure 1 for adjusting the bushing. On the bosses (29) of the shroud (21a) I have provided a hollowed out cap members (43) which are reduced and externally threaded as at (44) to engage the internal threads of the bosses (29), see view A of Figure 14. In each cap member is an adjusting washer (45) with a locking pin (46) and a set screw (47) see view B of Figure 14. The washers bear against the upstanding reduced flanges (48) of the bushing (25) and they may be adjusted by manipulating the set screws (47) to exert more or less pressure on the bushings and consequently on the packing (33).

The bushings (25) are annularly grooved as at (49) externally to provide an oil duct, and openings (50) lead from the oil duct to the oil grooves (12) of the pins (9). The flanged part (48) of each bushing are also provided with oil ports (51) which also serve to receive a suitable tool (X) for removing the bushings when the caps are removed as shown in Figure 13, where a spring metal tool is used and simply inserted and pressed by the fingers (Y). The bushings are also provided with grooves for oil interiorly as designated by (52).

As shown in Figure 17 the adjusting member may be concealed wholly under the shroud, in which case the shroud has no openings or bosses. In this case the outer faces of the walls of the ring sections are screw threaded to receive a threaded adjusting plate (53) which is locked in adjusted position by pinching the threads as at (54) with a screw (55). In Figure 18 the outer faces of the walls of the rings sections are slightly flaring or sloped and threaded to receive a threaded oil seal member (56), which is placed under the shroud above the plate (53).

In the modified forms of my invention, shown in Figures 20 to 23, inclusive, I am enabled to seal the body of circulating lubricating oil within the two sections of the ring by providing an enlarged oil basin (57) from which the grooves (17) lead. By so doing, a wall (58) is left between the basin (57) and the shroud (21a), whereas in the other forms of my invention, the cavities (16), serving a somewhat similar purpose, are opened to the shroud. In practice, oil flowing in the grooves (17) is received and stored up in the basins (57) and possible seepage of oil is prevented and the external periphery of the ring sections is largely solid metal, except for the pin openings (15).

The modified form of bushing adjustment shown in Figures 20 to 23, inclusive, contemplates the use of the usual bushing (25) and packing (33), but the bushing is threaded into a tapered opening (62) shown in Figure 22 and also in Figure 21. This provides a much simpler structure and one which is especially effective, and possible seepage of oil is prevented and it is not necessary to form the opening and bosses (29) in the shroud.

While the foregoing illustrates some of the special embodiments of my invention within the purview of the broad concept, it is again emphasized that interpretation of the invention should only be conclusive when made in the light of the subjoined claims.

1. In a universal joint having knuckles carrying pins, a split ring retaining the pins to complete the operative assembly of the joint, one of the knuckles provided with a sealed cavity in an integral part thereof for storing lubricant, said pins and said ring being provided with ducts forming a closed system of oil distribution from the cavity in the knuckle, circulation of the oil in which is attained by centrifugal force, bushings about the pins, and packing about the bases of the pins, the bushings being arranged above the packing and adjustable longitudinally of the pins and removable to change the packing or compress the same to prevent leakage of oil from about the bases of the pins.

2. In a universal joint having knuckles carrying pins, a split ring retaining the pins to complete the operative assembly of the joint, an annular shroud carried about the peripheral edge of the ring and having screw threaded engagement with one ring section and flanged down on the other ring section to retain the same in place, a plurality of bushings carried by the shroud, one surrounding and enclosing each pin, and being removably attached to the shroud and adjustable longitudinally of the pins, packing about the bases of the pins, and the bushings arranged with their lower edge portions bearing upon the packing to compress the same both against the walls of the pins and ring and against the bases of the pins to prevent leakage of oil from about the bases of the pins.

3. Means for preventing leakage of oil from about the pins of a universal joint of the type having a split ring for retaining the pins to complete the joint assembly, and a shroud about the ring, comprising a plurality of bushings, one about each pin, said bushings being adjustably and removably carried by the shroud, packing about the base of each pin, and the bushings arranged above and compressing the packing to seal the bases of the pins to prevent leakage of oil from about the bases of the pins; said shroud preventing leakage of oil from about the ends of the pins.

4. In a universal joint having knuckles carrying pins, and a split ring formed with sections for retaining the pins to complete the operative assembly of the joint, a retaining shroud about the sections of the ring, the ring sections formed to provide a continuous lubricating channel beneath the shroud, each section of the ring having cavities formed therein for balancing the joint and for storing lubricant, annular channels in the ring sections connecting the cavities, the pins being grooved to register with the channels, one knuckle of the joint having a sealed cavity therein for storing lubricant, and the pins formed with oil ducts leading to the reservoir and the grooves for providing a closed system of lubrication; the circulation of which is induced by centrifugal force when the joint is in operation.

5. In a universal joint comprising a sectional ring member for holding the pins of the joint in operative assembly, cylindrical bushings about the pins and provided with oil distributing means, and manually detachable and adjustable means disposed over the ends of the pins and spaced therefrom and bearing against the respective bushings to adjust the position of the same, and packing beneath the bushings and about the pins.

6. In a universal joint comprising a sectional ring member for holding the pins of the joint in operative assembly, a shroud about the outer periphery of the ring member, bushings about the pins, packing beneath and engaged by the bushings, said packing extending about the bases of the pins, and a cap member carried by the shroud for each bushing, said cap members each carrying adjustable means for varying the pressure on the respective bushings to adjust the pressure on the packings about the pins, said cap members being removable and said bushings being slidable into position between the surfaces of the pins and the walls of the ring sections.

7. In a universal joint comprising a sectional ring member for holding the pins in operative assembly, a shroud about the outer periphery of the ring member, said ring sections having oil lubricating channels leading to the pins, and a plurality of enlarged cavities in the peripheral part of the ring member and communicating with the channels and forming basins for the storage of lubricating oil, said enlarged cavities being separated from the shroud by a wall.

In testimony whereof, I affix my signature hereunto.

VILLOR P. WILLIAMS.